US011409183B1

(12) United States Patent
Gehl et al.

(10) Patent No.: US 11,409,183 B1
(45) Date of Patent: Aug. 9, 2022

(54) PHASE-WRAPPING METHOD FOR BEAM STEERING IN OPTICAL PHASED ARRAYS

(71) Applicant: National Technology & Engineering Solutions of Sandia, LLC, Albuquerque, NM (US)

(72) Inventors: Michael Gehl, Albuquerque, NM (US); Christopher Michael Long, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 67 days.

(21) Appl. No.: 17/182,883

(22) Filed: Feb. 23, 2021

Related U.S. Application Data

(60) Provisional application No. 62/982,236, filed on Feb. 27, 2020.

(51) Int. Cl.
*G02F 1/295* (2006.01)

(52) U.S. Cl.
CPC .................................. *G02F 1/2955* (2013.01)

(58) Field of Classification Search
CPC ... G02F 1/2955; G02F 1/292; G02B 6/12009; G02B 6/29301; G02B 27/0087
See application file for complete search history.

(56) References Cited

U.S. PATENT DOCUMENTS

| 8,364,430 | B2* | 1/2013 | Kebabian | H03L 7/18 324/76.12 |
|---|---|---|---|---|
| 10,599,098 | B2* | 3/2020 | Favalora | H04N 13/32 |
| 10,678,117 | B2* | 6/2020 | Shin | G01S 7/4813 |
| 10,944,477 | B2* | 3/2021 | Fatemi | H04B 10/61 |
| 10,983,413 | B2* | 4/2021 | Shin | G01S 7/4817 |
| 10,989,984 | B2* | 4/2021 | Byun | G02F 1/3137 |
| 11,320,717 | B2* | 5/2022 | Zhu | G01S 17/89 |
| 2018/0321569 | A1* | 11/2018 | Spector | G02F 1/2955 |

OTHER PUBLICATIONS

Gehl, M. et al., "Phase Optimization of a Silicon Photonic Two-Dimensional Electro-Optic Phased Array," Optical Society of American, 2019, CLEO 2019, 2 pages.
Sun, J. et al., "Large-Scale Nanophotonic Phased Array," Nature, 2013, vol. 493, pp. 195-199.
Zadka, M. et al., "On-Chip Platform for a Phased Array with Minimal Beam Divergence and Wide Field-of-View," Optics Express, 2018, vol. 26, pp. 2528-2534.
Hulme, J. C. et al., "Fully Integrated Hybrid Silicon Two dimensional beam scanner," Optics Express, 2015, vol. 23, pp. 5861-5874.
(Continued)

*Primary Examiner* — John Bedtelyon
(74) *Attorney, Agent, or Firm* — Martin I. Finston

(57) ABSTRACT

A method and apparatus are provided for controlling the phase shifts produced in a binary corporate tree network of the kind, e.g., that can drive a phased array for steering an optical beam. The method employs a novel phase-wrapping technique in which an entire layer of the binary tree is disabled when the phase added in that layer reaches $2\pi$. With that technique, it is possible to economize on electrical control lines and on the use of electric power, while still maintaining the ability to produce arbitrary phases at the output of the tree network.

14 Claims, 3 Drawing Sheets

(56) References Cited

OTHER PUBLICATIONS

Chung, S. et al., "A Monolithically Integrated Large-Scale Optical Phased Array in Silicon-on-Insulator CMOS," IEEE Journal of Solid-State Circuits, 2018, vol. 53, pp. 275-296.
Derose, C. et al., "High Speed Travelling Wave Carrier Depletion Silicon Mach-Zehnder Modulator," Optical Interconnects Conference, Santa Fe, NM, USA, 2012, pp. 135-136.
Derose, C. et al., "Electronically Controlled Optical Beam-Steering by an Active Phased Array of Metallic Nanoantennas," Optics Express, 2013, vol. 21, pp. 5198-5208.
Choo, G. et al., "Automatic Monitor-Based Tuning of an RF Silicon Photonic 1X4 Asymmetric Binary Tree True-Time-Delay Beamforming Network," Journal of Lightwave Technology, 2018, vol. 36, pp. 5263-5275.
Meijerink, A. et al., "Novel Ring Resonator-Based Integrated Photonic Beamformer for Broadband Phased Array Receive Antennas—Part I: Design and Performance Analysis," Journal of Lightwave Technology, 2010, vol. 28, pp. 3-18.

* cited by examiner

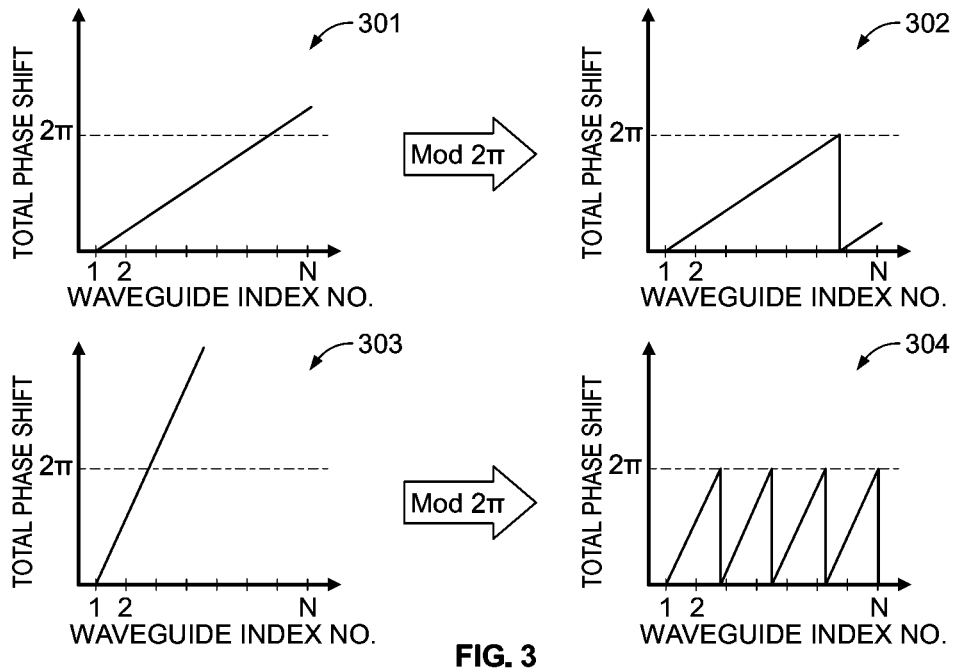
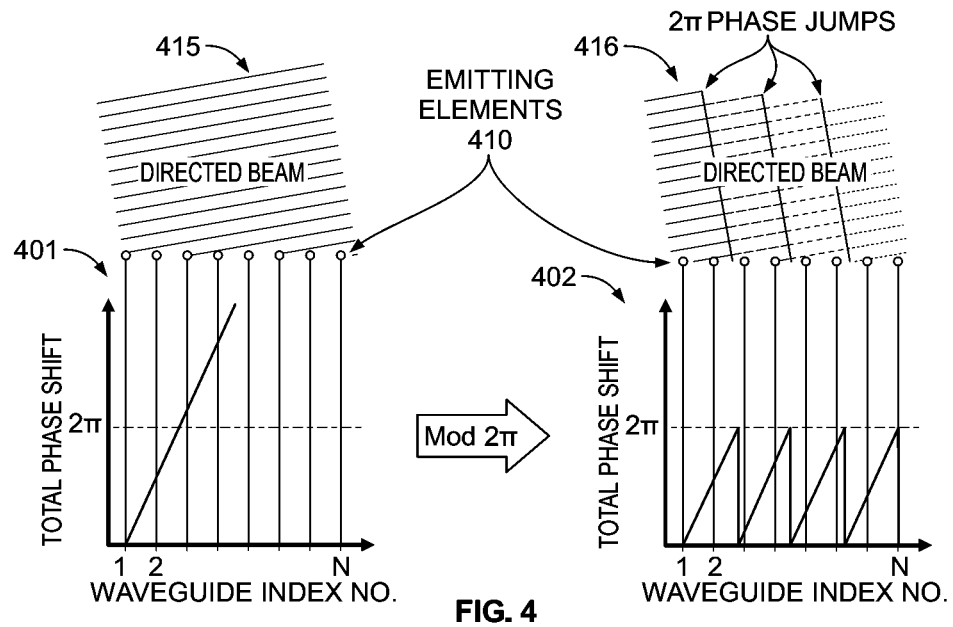
FIG. 3
FIG. 4

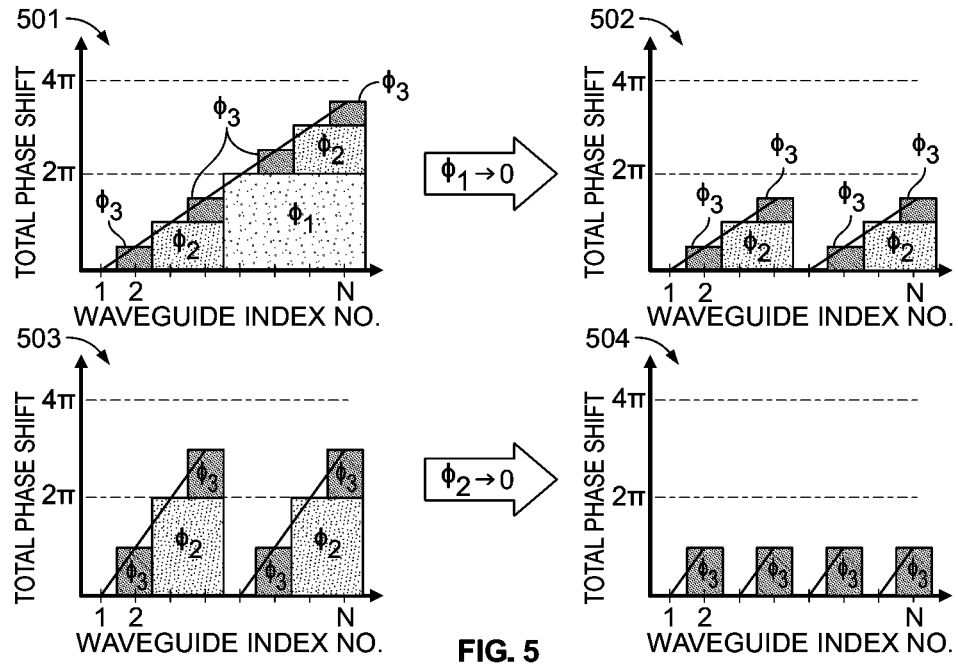
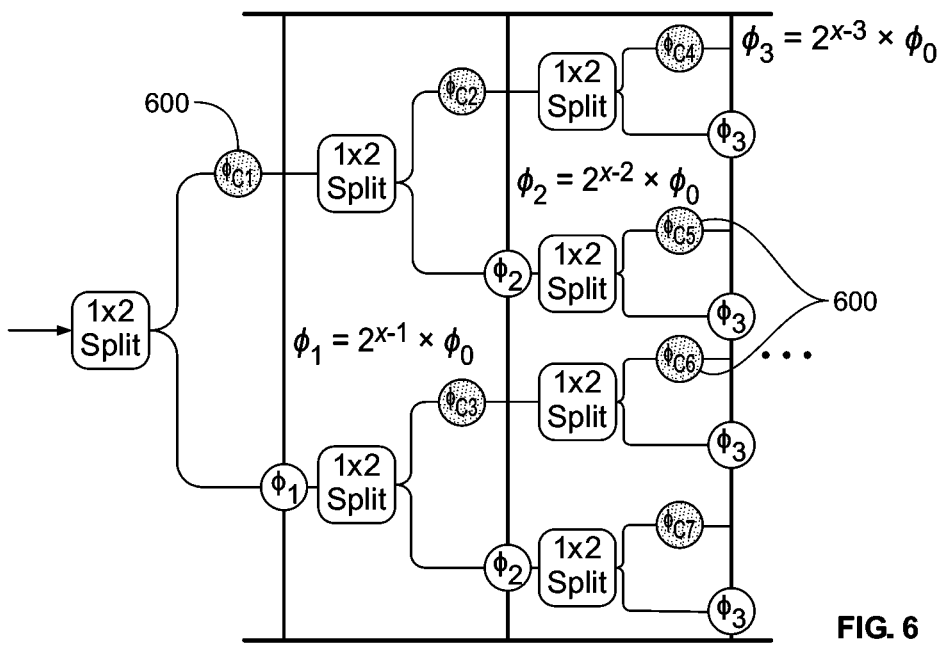
FIG. 5
FIG. 6

PHASE-WRAPPING METHOD FOR BEAM STEERING IN OPTICAL PHASED ARRAYS

CROSS-REFERENCE TO RELATED APPLICATION

This application claims the benefit of U.S. Provisional Application No. 62/982,236, filed Feb. 27, 2020, the entirety of which is hereby incorporated herein by reference.

STATEMENT OF GOVERNMENT RIGHTS

This invention was made with United States Government support under Contract No. DE-NA0003525 between National Technology & Engineering Solutions of Sandia, LLC and the United States Department of Energy/National Nuclear Security Administration. The United States Government has certain rights in this invention.

TECHNICAL FIELD

This invention relates to photonic integrated circuits.

ART BACKGROUND

In the fields of optical communication and optical signal processing, it is often necessary to manipulate the phases of the optical signals. For example, in applications of arrayed waveguide gratings (AWGs) for optical filtering, it is important to be able to shift the relative optical phases in the AWG. Shifting of the relative phases in an AWG is likewise important for optical beam steering in LIDAR applications, among others.

Photonic integrated circuits (PICs) provide a platform that is widely used for optical processing, including applications of AWGs.

The following published articles provide some examples of PICs designed for beam-steering applications. Each of the following articles is hereby incorporated herein by reference in its entirety:

Michael Gehl, et. al., "Phase optimization of a silicon photonic two-dimensional electro-optic phased array," CLEO 2019, Optical Society of America (2019), ("Gehl 2019");

Jie Sun, et. al., "Large-scale nanophotonic phased array," *Nature* 493, 195-199 (2013), ("Sun 2013");

Moshe Zadka, et. al., "On-chip platform for a phased array with minimal beam divergence and wide field-of-view," *Optics Express* 26, 2528-2534 (2018), ("Zadka 2018");

J. C. Hulme, et. al., "Fully integrated hybrid silicon two dimensional beam scanner," *Optics Express* 23, 5861-5874 (2015), ("Hulme 2015");

SungWon Chung, et. al., "A monolithically integrated large-scale optical phased array in silicon-on-insulator CMOS," *IEEE J Solid-St Circ* 53, 275-296 (2018), ("Chung 2018");

Christopher T. DeRose, et. al., "High speed travelling wave carrier depletion silicon Mach-Zehnder modulator," *Optical Interconnects Conference*, Santa Fe, N. Mex., USA (2012), ("DeRose 2012");

Christopher T. DeRose, et. al., "Electronically controlled optical beam-steering by an active phased array of metallic nanoantennas," *Optics Express* 21, 5198-5208 (2013), ("DeRose 2013").

Although there is already growing demand for PICs in applications such as LIDAR, the manipulation of optical phases on a PIC continues to face difficulties, due at least in part to the compact geometry and power limitations of such a platform.

For example, it is very advantageous, especially when implementing complex functionality, if an arbitrary phase can be applied individually to each of the output waveguides on a PIC. In a structure with N waveguides, however, such individual phase control would require N independent phase shifters with N independent electrical control lines. As N may be on the order of tens or even hundreds of waveguides, both spatial and thermal constraints could limit the application of individual phase control.

An alternative to individual phase control can be provided by arranging the phase shifters in a tree network having multiple levels, with phase shifters placed at the nodes within respective levels. Within each level, multiple nodes can share the same phase control line and produce the same phase shift, but different values of a total, accumulated phase shift can be established by defining different paths through the tree network. Although such approaches are useful, there is still a need to improve their power efficiency and spatial efficiency without limiting control over the phase shifts that can be produced.

SUMMARY OF THE INVENTION

We have devised a new method for controlling the phase shifts produced in a binary corporate tree network of the kind, for example, that can drive a phased array for steering an optical beam. Our method applies a technique known as phase wrapping. Phase wrapping is the operation of mapping arbitrary values of the phase back to mathematically equivalent values falling on the interval $[0, 2\pi]$, or on another interval of similar length. This is done by casting out additive factors of $2\pi$, or in other words, by performing a modulo $2\pi$ operation.

In our version of phase wrapping, we shut off an entire layer of the binary tree when the phase added in that layer reaches $2\pi$. By using that approach, we are able to economize on electrical control lines and on the use of electric power, while still maintaining the ability to produce arbitrary phases at the output of our tree network.

Accordingly, the invention in one aspect relates to a method for generating a plurality of phase-shifted replicas of an input optical signal, comprising:

injecting the input optical signal into a binary tree network, wherein said network has a plurality of levels and one or more nodes at each level, and wherein said network is conformed to split the input optical signal among a plurality of output waveguides;

at each node of said network, splitting incoming light between a phase-shifting path and a non-phase-shifting path, wherein each of the phase-shifting paths passes through a primary phase shifter that is specific to the level to which the said node belongs; and applying control signals to at least some of the primary phase shifters so as to produce respective controlled phase shifts, wherein at each level, the same control signal is applied to all primary phase shifters specific to that level;

wherein the control signals are applied subject to a condition that all primary phase shifters in a given row must be disabled when their phase shift reaches $2\pi$.

BRIEF DESCRIPTION OF THE DRAWINGS

FIG. 3 contains four graphs similar to the graph of FIG. 2. The graphs are arranged into an upper pair and a lower pair. The graphs illustrate how phase wrapping produces a sawtooth pattern in the plot of phase shift versus waveguide index. The left-hand graph in each pair shows an example without phase wrapping, and the right-hand graph shows the result when phase wrapping is applied so that no phase shift exceeds $2\pi$.

FIG. 4 is an idealized diagram that relates the direction of a plane wave emitted by an antenna array to the linear phase shift that drives the array. The left-hand view in the figure represents beam steering without phase wrapping, and the right-hand view represents beam steering with phase wrapping.

FIG. 5 presents four graphs, similar to the graph of FIG. 2, in which the total accumulated phase shift is plotted versus the output waveguide index. As in FIG. 2, differently shaded boxes are provided, in which the height of each box represents the amount of phase shift applied at a particular layer of the tree. The upper pair of graphs in the figure illustrate the effect of phase wrapping when layer 1 reaches a phase shift of $2\pi$. The lower pair of graphs in the figure illustrate the effect of phase wrapping when layer 2 subsequently reaches a phase shift of $2\pi$.

FIG. 6 is a schematic diagram similar to FIG. 1, but further including a set of extra phase shifters for error correction.

DETAILED DESCRIPTION

Phase delay accumulates additively along an optical path. If the N waveguides are replaced by N paths through a corporate tree structure, they can be arranged so that each path accumulates a different amount of delay. As a consequence, the input signal to the tree structure can be extracted from each of N output waveguide with up to N different values of the phase delay.

Figure 1:
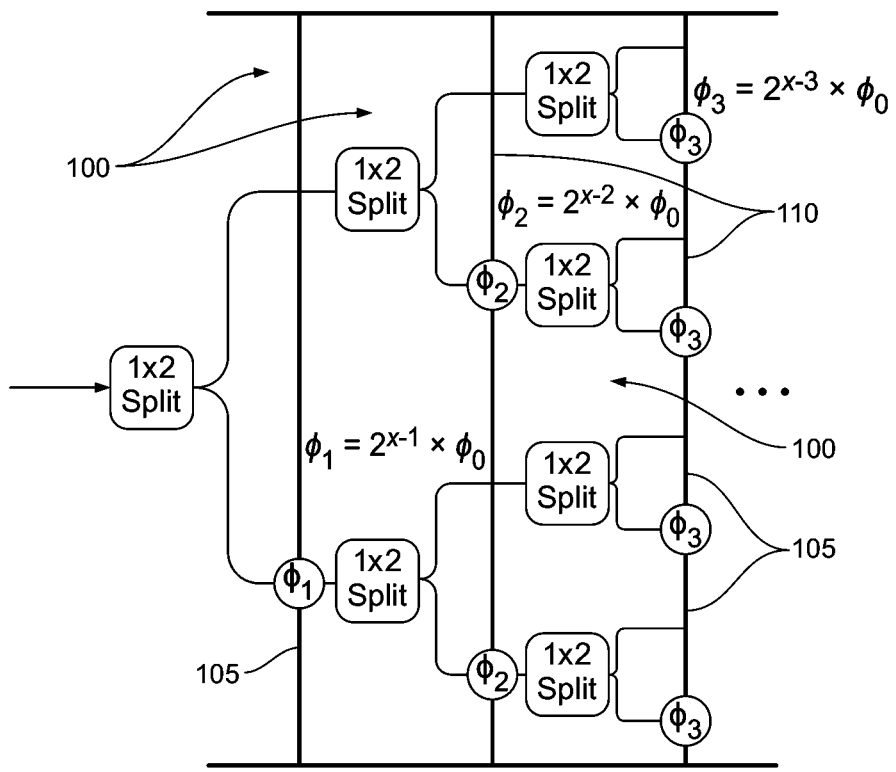
FIG. 1 is a schematic drawing of a phase-shifting optical network having a corporate tree structure.

Such a corporate tree structure is shown in FIG. 1. As seen in the figure, the tree structure has x layers 100, the number of paths doubles at each layer, and the number N of output waveguides therefore equals $2^x$.

The structure of FIG. 1 still requires N−1 phase shifters 105. That is, the last layer has N/2 shifters, the next preceding layer has N/4 shifters, and the series proceeds by successively halving the number of shifters until a single shifter is reached in the first layer. If N is an integer power of 2, then, as is easily shown, the sum of $N/2+N/4+ \ldots +1$ equals N−1.

Although N−1 phase shifters are needed, the phase shifters in each layer of the tree can be connected in parallel so that the same phase shift is applied. This reduces the number of required electrical control lines 110 to only $\log_2(N)=x$. For example, a ten-layer tree would have $N=2^{10}=1024$ output waveguides, but it would need only ten control lines.

A linear phase shift across the N outputs of the tree, i.e. a phase shift that changes in equal increments from each output waveguide to the next, can be achieved by applying a phase shift to each layer that is double the phase shift applied to the next layer in sequence. Linear phase shifts are useful, for example, as the driving signals to a phased array for the purpose of beam steering.

With reference to FIG. 1, for example, the phase shift applied at each layer i of the tree is there denoted as $\varphi_i$, $i=1, 2, \ldots, x$. At layer 1, there is a 1×2 split into a path that undergoes a phase shift of $\varphi_1$ and a path that undergoes a phase shift of 0. Each of the now-doubled number of paths undergoes a similar split into respective paths that undergo a further phase shift of $\varphi_2$ or a further phase shift of 0. The process continues in like manner until the final phase shifts $\varphi_x$ are applied at layer x of the tree.

The scheme in which the applied phase shift is halved between each layer and the next is illustrated in FIG. 1. In that scheme, the basic unit $\varphi_0$ of phase shift is applied at layer x. At each of the other layers i, the applied phase shift $\varphi_i$ is equal to $2^{x-i} \times \varphi_i$. The result is that the N output signals from layer x have respective accumulated phase shifts that range from 0 to $(N-1)\varphi_0$ in equal increments of the last phase shift that was applied; i.e., in equal increments of $\varphi_0$.

Figure 2:
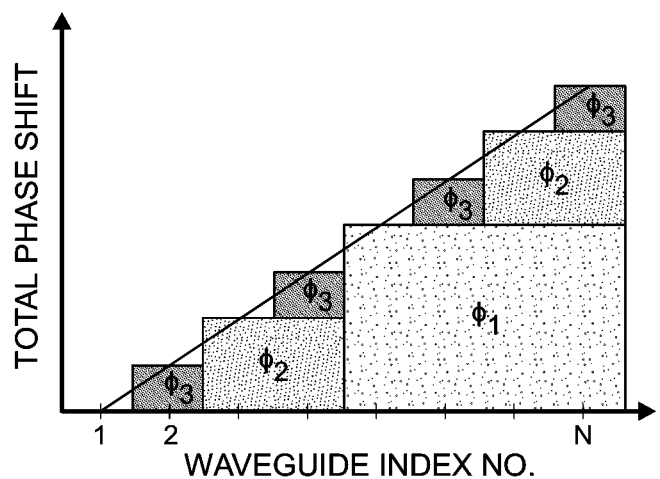
FIG. 2 is a graph of the total accumulated phase shift at the output waveguides of the network of FIG. 1, versus the output waveguide index. Differently shaded boxes are provided, in which the height of each box represents the amount of phase shift applied at a particular layer of the tree network.

FIG. 2 is a graph of the total accumulated phase shift versus the output waveguide index, i.e., the position of the output waveguide in sequence from 1 to N. This figure is provided as a guide to an intuitive understanding of how the phase shifts accumulate. The height of each box in the figure represents the amount of phase shift applied at a particular layer of the tree. The boxes have different shadings corresponding to the different layers that they represent. Three layers are represented in the figure. Since there is a binary choice at each layer, there are eight possible combinations of applied phase shifts (including the zero combination), as shown in the figure. It is readily apparent from the figure that the resulting total phase shifts vary incrementally, and that the size of the increment is the size of the last-applied phase shift.

Phase Wrapping. Conventionally, large linear phase shifts are often utilized in applications such as beam steering. In such cases, the total accumulated phase difference between the first and last waveguide can be many multiples of $2\pi$. This often requires the cascading of additional phase shifters, which undesirably increases optical losses and power requirements for electrical control.

As is well known, the phase of an oscillating signal is periodic, with a period of $2\pi$. Hence, any two values of the phase that differ by a multiple of $2\pi$ are mathematically equivalent. Phase wrapping is the operation of casting out multiples of $2\pi$ until the value of the phase is less than $2\pi$. In other words, it is the operation of reducing the phase to its value, modulo $2\pi$.

In phased array systems operating with a lower carrier frequency, for example RF systems, it can be important to maintain a true time delay between each channel and the next, and not simply a difference in phase. In such a case, phase wrapping could cause errors in any signal modulated onto the carrier signal. But in optical phased arrays, the carrier frequency is typically on the order of 200 THz or more. Thus, modulations as large as several gigahertz are still only a tiny fraction of the carrier frequency. As a result, the relatively low frequency modulation signal sees very little difference between a true time delay and phase wrapping of the carrier signal.

Hence, phase wrapping could, in principle, be applied to the linear phase shift produced in an optical phased array. With phase wrapping, the same desired beam steering could be achieved, but with significantly less power consumption, as each phase shifter would only need to tune between 0 and $2\pi$.

Although the same desired beam steering can be achieved with or without phase wrapping, it should be noted that with phase wrapping, the resulting phase in the output signals will follow a sawtooth pattern across the N output waveguides. This is illustrated in FIG. 3. In each pair of graphs 301-302, 303-304 in the figure, the total phase shift is plotted versus the index, i.e., the sequential position, of the output waveguide. The left-hand graph in each pair shows an example without phase wrapping, and the right-hand graph shows the result when phase wrapping is applied so that no phase shift exceeds $2\pi$.

FIG. 4 is provided as a pedagogical aid to illustrate the effect of phase wrapping on the direction of the emitted radiation when the antenna array is driven by a linear phase shift. The left-hand view 401 in the figure represents beam steering without phase wrapping, and the right-hand view 402 represents beam steering with phase wrapping. In both views, each emitting element 410 is shown as producing a wavefront at a respective delay, and the wavefronts thus produced are shown, in an idealization, as cumulatively giving rise to a plane wave 415, 416. The plane wave is shown radiating at the same angle in both the left-hand and right-hand views. In the left-hand view, the respective delays increase sequentially and monotonically across the antenna array, reaching values in excess of $2\pi$. In the right-hand view, by contrast, phase jumps constrain the delays to values below $2\pi$.

In a naïve approach, phase wrapping could be applied to the tree structure of FIG. 1 simply by constraining the tree structure so that the phase at each output waveguide must be reset when it reaches $2\pi$. Such an approach would conserve a significant amount of electric power.

However, there are practical difficulties with such an approach. In a typical scan using the phased array of FIG. 4, for example, the maximum phase shift $\phi N$, i.e. the phase shift at the last output waveguide, is gradually increased in order to sweep the beam direction. As $\phi N$ continues to increase from zero without constraint, each output waveguide, in sequence, will individually reach and surpass a phase delay of $2\pi$. This will begin with the N'th output waveguide and will work back, one waveguide at a time, to the beginning of the output waveguide array.

Although it would be possible to apply phase wrapping to each individual output waveguide as it reaches a phase delay of $2\pi$, this could be done only by providing at least some of the phase shifters in the tree structure with individual control lines. Otherwise, it would not be possible to apply an arbitrary linear phase shift across the output waveguides.

By contrast, the new phase-wrapping control technique that we have devised reduces electric power consumption without multiplying the number of control lines. With our approach, the same bias is applied to all phase shifters in a given level of the tree structure, and an arbitrary linear phase shift can still be applied across the output waveguides.

Phase-Wrapping Control in the Corporate Tree Waveguide Structure. Our new approach is more easily understood with reference to the tree structure of FIG. 1 and the sawtooth patterns of FIG. 3. In our new approach, the modulo a operation is applied, as before, to produce a jump in the generated sawtooth pattern as seen, e.g., in FIG. 3. However, the jump can now be produced only after a sequential position in the array of output waveguides whose index equals a power of 2. The reason for this is that the modulo a operation is now applied to an entire layer of the tree structure.

More specifically, the modulo a operation is applied only when a layer i of the tree structure has reached a phase shift of $2\pi$. At that point, layer i is turned off. This is better understood with reference to FIG. 5. FIG. 5 includes four graphs, similar to the graph of FIG. 2, in which the total accumulated phase shift is plotted versus the output waveguide index. Differently shaded boxes are again provided, in which the height of each box represents the amount of phase shift applied at a particular layer of the tree. The upper pair 501, 502 of graphs in the figure illustrate the effect of phase wrapping when layer 1 reaches a phase shift of $2\pi$. The lower pair of graphs 503, 504 in the figure illustrate the effect of phase wrapping when layer 2 subsequently reaches a phase shift of $2\pi$. Further explanation is provided below.

Turning to the upper left-hand graph in FIG. 5, we see that beginning with 0 phase shift across all N output waveguides, power is applied to each layer of the tree until the total linear phase shift at the last output waveguide is equal to $4\pi - (2\pi/N)$. By adding the phase delays in the respective layers, it is easily shown that absent phase wrapping, the total linear phase shift at the last output waveguide will always be $2\varphi_1 - \varphi_0$, where $\varphi_1$ is the phase shift applied at layer 1. Hence, the accumulated phase shift at the last output waveguide will equal $4\pi - (2\pi/N)$ when the value of $\varphi_0$ is $2\pi/N$ and the phase shifter in the first layer of the tree is applying a $2\pi$ phase shift.

We now turn off the layer-1 phase shifter. This effectively applies a modulo a operation to the linear phase. The linear phase shift is now wrapped, with a phase jump occurring between the $N/2$ and the $N/2+1$ output waveguides, as shown in the upper right-hand graph in the figure. It will be understood that the jump occurs at the midpoint of the output waveguide array because the propagating effect of the first binary choice, at layer 1, affects each half of the output array differently.

From this point forward, the phase shifter in the first layer can be left off. Power to the remaining phase shifters can be increased further to increase the linear shift, as shown in the lower left-hand graph in FIG. 5. Again, when the last waveguide (and now also the N/2 waveguide) reach a phase shift of $4\pi - (2\pi/N)$ the phase shifter in the second layer of the tree is applying a phase shift of $2\pi$. This phase shifter can be turned off, again effectively applying a modulo a operation. As shown in the lower right-hand graph in FIG. 5, the phase profile will now have jumps at waveguides $N/4 \rightarrow N/4+1$, $N/2 \rightarrow N/2+1$ and $3N/4 \rightarrow 3N/4+1$.

This pattern can be repeated again for each layer of the tree. As each modulo a operation is applied, a layer of phase shifters is turned off. One benefit of this approach is that overall, the required electrical power will not continue to increase as the wrapped linear phase shift increases. Instead, the electrical power requirement will be greatest just before the last modulo a operation is applied.

At that point, the second to last layer is applying a $2\pi$ phase shift and the last layer is applying a $\pi$ phase shift (because each layer shifts the phase by one-half the preceding phase shift). In terms of the total power $P_0$ required to achieve a $2\pi$ phase shift on a single waveguide, the total power requirement at that point will be $[(N/4) \times P_0] + [(N/2) \times (P_0/2)] = (N \times P_0)/2$.

The corresponding sequence of operations for a sweep in the reverse direction will be readily apparent, to those skilled in the art, from the above discussion.

Phase Error Correction. Up to this point, we have neglected the inevitable imperfections in a fabricated device that cause the phases of individual waveguides to deviate from their desired values. Passive errors can arise, for example, from imperfections in optical waveguide dimensions. Errors can also arise from differences in the efficiencies of the individual phase shifters. That is, identical control signals applied to all of the phase shifters in a single layer can still result in the creation of unequal phase shifts.

Referring back to FIG. 1, it will be recalled that each splitter in the tree structure shown there has two output paths, one of which includes a phase shifter, and the other of which does not. The phase errors listed above, and others like them, can be corrected by adding another set of phase shifters, which are placed in the splitter output paths of the second kind, i.e., those shown in FIG. 1 as lacking phase shifters.

FIG. 6 shows the tree structure of FIG. 1 with the addition of the set of extra phase shifters 600. The extra phase shifters may be passive devices, they may be active, or they may be some combination of the two. Passive phase shifting can be accomplished, e.g., by application of the photorefractive effect (i.e. material modification by exposure to UV light), application of the photoelastic effect (i.e. modification of optical properties by stress induced in the optical material), or by some other long-term modification to the waveguide dimensions or refractive index. Active phase shifting can be accomplished, e.g., by application of thermo-optic or electro-optic effects.

Passive corrections are advantageously applied to account for waveguide fabrication imperfections. Active corrections are advantageously applied to correct for differences in the primary phase shifters. Active correction would come at a cost, however, because it would necessitate adding N−1 more control lines, which would cancel some of the advantages of our design.

Resistance Trimming of Primary Phase Shifters. A further corrective approach is available as an alternative, or as an adjunct, to any of the approaches described above. This further approach involves passive tuning of the electro-optic response of the primary phase shifters, i.e., the phase shifters of FIG. 1. This can be implemented, for example, with trim resistors.

That is, one or more integrated resistive elements are placed either in series or in parallel with the phase shifter that is to be corrected. The resistances of individual trim resistors can be tuned after they have been fabricated, using controllable techniques such as the laser annealing of dopants. Such post-fabrication tuning can modify the current-voltage characteristic of the individual phase shifter to align it with desired behavior. All phase shifters in a given control layer can thus be aligned to produce identical phase shifts in response to a given control signal.

In a current-controlled phase shifter, for example, a single series-connected trim resistor can be used to limit current through the device. In one type of correction, laser annealing would decrease the resistance of the trip resistor, thereby allowing more current to flow.

In a voltage-controlled phase shifter, a pair of trim resistors can be used to form a voltage divider. In one type of correction, laser annealing of one of the two resistors would be used to tune the voltage ratio of the divider.

Amplitude Error Correction. It may be desirable to correct for power-splitting errors in the optical splitters of the tree structure and the like, or to provide amplitude corrections for other purposes such as beam shaping. Amplitude modulators can be added to the tree structure to provide amplitude corrections. Example devices for that purpose include on-chip amplitude modulators based on optical couplers, as are well known in the art.

Implementation. There are known methods for fabricating a PIC that can potentially include a phase-shifting binary tree network as described here. For example, Gehl 2019 describes a silicon photonic two-dimensional electro-optic phased array fabricated by CMOS technology on an SOI wafer with a 230-nm silicon device layer. In that device, the input optical signal is divided into sixteen separate paths by a star coupler splitter, and each path is individually shifted in phase by a low energy, electro-optic phase shifter of the kind described in DeRose 2012. The output antenna array is a grid of parallel waveguides, each of which is modified to radiate scattered light by adding a tantalum metal grating or by fabricating a side-wall grating in the waveguide. Beam steering in the direction transverse to the antenna axis is performed by controlling the respective phase shifts. Beam steering in the longitudinal direction is performed by tuning the optical wavelength so as to control the diffraction angle from the waveguide gratings.

In another example of applicable technology, Hulme 2015 describes a PIC on a hybrid III-V/silicon platform that is capable of beam steering from an optical phased array. As in the DeRose 2012 device, transverse steering is performed via phase shifts, and longitudinal steering is performed via wavelength tuning. P-i-n diodes were used for phase shifting.

In the Hulme 2015 device, the optical input signal from a redundant pair of tunable lasers passed through SOA pre-amplifiers and was then divided into separate paths by a 32-channel optical splitter conformed as a binary tree. The signal in each of the 32 channels was tuned in phase and amplitude and then fed into the antenna array, which consisted of a grid of parallel waveguides with etched emitter gratings.

The silicon portion of the Hulme 2015 device was fabricated on 500-nm SOI with 1 µm buried oxide. Rib waveguides were patterned using 248-nm DUV lithography and etched 275 nm. The p-i-n diodes for the phase modulators were made by implanting with boron and phosphorus and annealing at 1050° C. The emitter gratings were formed over the waveguides by electron-beam lithography with a 50-nm etch.

The optical gain regions of the Hulme 2015 device were formed by bonding III-V epitaxial material to the top silicon, followed by removal of the III-V substrate by mechanical polish and wet etch. The remaining III-V material was then patterned and dry etched to create the gain elements for laser and amplifier sections. Metal contacts were added for the gain sections and the phase-modulator sections by electron-beam deposition. A buffer layer of silicon oxide was deposited by PECVD.

The invention claimed is:
1. A method, comprising:
injecting an input optical signal into a binary tree network conformed to split the input optical signal into output optical signals distributed over a plurality of output waveguides, wherein the network has a plurality of levels and one or more nodes at each level;
at each of the nodes, splitting incoming light between a phase-shifting path and a non-phase-shifting path, wherein each of the phase-shifting paths passes through a primary phase shifter at the level to which the node belongs; and
applying control signals to at least some of the primary phase shifters so as to produce controlled phase shifts;
wherein all primary phase shifters at each level receive the same control signal, thereby to produce a level-specific phase shift that is the same for all primary phase shifters at that level; and
wherein the control signals are applied subject to a condition that when a level-specific phase shift increases to $2\pi$, it must be reset to zero.

2. The method of claim 1, wherein:
the plurality of output waveguides drives an antenna array having a beam direction; and
the control signals are varied so as to sweep the beam direction.

3. The method of claim 2, wherein any level-specific phase shift that is reset to zero while sweeping the beam direction is maintained at zero until the sweeping terminates or changes direction.

4. The method of claim 1, wherein:
the binary tree network has a first level, a last level, and at least one intermediate level between the first and last levels; and
unless it has been reset to zero, the level-specific phase shift at the first and each intermediate level is double the level-specific phase shift at the level that next follows it.

5. The method of claim 1, further comprising: operating a plurality of active corrective phase shifters that are arranged to correct phase errors in the output optical signals.

6. The method of claim 5, wherein the active corrective phase shifters are situated in non-phase-shifting paths of the binary tree network.

7. The method of claim 1, wherein passive corrective phase shifters are used to correct phase errors in the output optical signals.

8. Apparatus, comprising:
an optical binary tree network conformed to split an input optical signal into output optical signals distributed over a plurality of output waveguides; and
a control circuit arranged for applying control signals to primary phase shifters in the optical binary tree network, thereby to produce respective controlled phase shifts, wherein:
the network has a plurality of levels and one or more nodes at each level;
incoming light is split at each of the nodes between a phase-shifting path and a non-phase-shifting path;
each of the phase-shifting paths passes through a primary phase shifter at the level to which the node belongs;
the control circuit is arranged to deliver the same control signal to all primary phase shifters at each level, thereby to produce a level-specific phase shift that is the same for all primary phase shifters at that level; and
the control circuit comprises a tangible medium in which is embodied a condition that when a level-specific phase shift increases to $2\pi$, it must be reset to zero.

9. The apparatus of claim 8, wherein:
the plurality of output waveguides drives an antenna array having a beam direction;
the control signals are variable in a manner that can sweep the beam direction; and
the tangible medium further embodies a condition that any level-specific phase shift that is reset to zero while sweeping the beam direction must be maintained at zero until the sweeping terminates or changes direction.

10. The apparatus of claim 8, wherein:
the binary tree network has a first level, a last level, and at least one intermediate level between the first and last levels; and
the tangible medium further embodies a condition that unless it has been reset to zero, the level-specific phase shift at the first and each intermediate level must be double the level-specific phase shift at the level that next follows it.

11. The apparatus of claim 8, further comprising a plurality of corrective phase shifters arranged to correct phase errors in the output optical signals.

12. The apparatus of claim 8, wherein the plurality of corrective phase shifters comprises active phase shifters.

13. The apparatus of claim 8, wherein the plurality of corrective phase shifters comprises passive phase shifters.

14. The method of claim 8, wherein the corrective phase shifters are situated in non-phase-shifting paths of the binary tree network.

* * * * *